United States Patent
Clarke et al.

(10) Patent No.: US 11,311,022 B2
(45) Date of Patent: Apr. 26, 2022

(54) SYSTEM AND METHOD FOR MIXING POLYUNSATURATED FATTY ACIDS INTO A FLUID FOOD PRODUCT

(71) Applicant: WhiteWave Services, Inc., Denver, CO (US)

(72) Inventors: Elle Ann Clarke, Lakewood, CO (US); Dennis Keith Chapman, Thornton, CO (US); Gary Thomas Jerger, Green Cove Springs, FL (US)

(73) Assignee: WHITEWAVE SERVICES, INC., Denver, CO (US)

( * ) Notice: Subject to any disclaimer, the term of this patent is extended or adjusted under 35 U.S.C. 154(b) by 87 days.

(21) Appl. No.: 15/438,410

(22) Filed: Feb. 21, 2017

(65) Prior Publication Data

US 2018/0235250 A1 Aug. 23, 2018

(51) Int. Cl.
*A23C 9/152* (2006.01)
*B01F 3/08* (2006.01)
(Continued)

(52) U.S. Cl.
CPC ............ *A23C 9/1528* (2013.01); *A23C 11/02* (2013.01); *B01F 3/0807* (2013.01);
(Continued)

(58) Field of Classification Search
CPC .... A23C 9/1528; B01F 3/0807; B01F 3/0853; B01F 3/0865; B01F 5/104; B01F 5/106
See application file for complete search history.

(56) References Cited

U.S. PATENT DOCUMENTS

| | | | |
|---|---|---|---|
| 4,390,284 A | 6/1983 | Hyde | |
| 5,298,271 A * | 3/1994 | Takashina | A23L 3/3418 426/312 |

(Continued)

FOREIGN PATENT DOCUMENTS

| | | | |
|---|---|---|---|
| DE | 10 2004 052 061 A1 | 2/2006 | |
| EP | 1519656 B1 * | 6/2006 | A23L 2/42 |

(Continued)

OTHER PUBLICATIONS

PCT Notification of Transmittal of the International Search Report and the Written Opinion of the International Searching Authority, or the Declaration for International application No. PCT/US2018/018889—dated May 30, 2018.

(Continued)

*Primary Examiner* — Stephanie A Cox
(74) *Attorney, Agent, or Firm* — Baker Botts, LLP

(57) ABSTRACT

A method for producing a mixture of oil and fluid food product includes placing a funnel into a pressure tank such that a stem of the funnel extends at least halfway down into the pressure tank. The pressure tank is flushed with nitrogen. Oil flows into the pressure tank through the funnel. A flow of nitrogen into the pressure tank is maintained through a side inlet of the pressure tank. Oil is dispensed from a pressure tank into the transfer line flowing a flow of fluid food product from a batch tank. The dispensed oil is dispersed into the flow of fluid food product in a inline shear mixer creating oil-in-fluid food product droplets. The oil-in-fluid food product droplets flow to the batch tank with the flow of fluid food product. The oil-in-fluid food product droplets are distributed in a volume of fluid food product in the batch tank.

19 Claims, 4 Drawing Sheets

(51) Int. Cl.
  *B01F 15/00*   (2006.01)
  *B01F 5/10*   (2006.01)
  *A23C 11/02*   (2006.01)

(52) U.S. Cl.
  CPC .......... *B01F 3/0853* (2013.01); *B01F 3/0865* (2013.01); *B01F 5/104* (2013.01); *B01F 5/106* (2013.01); *B01F 15/00142* (2013.01); *B01F 15/00025* (2013.01); *B01F 2003/0834* (2013.01); *B01F 2003/0842* (2013.01); *B01F 2215/0006* (2013.01)

(56) References Cited

U.S. PATENT DOCUMENTS

| | | | | |
|---|---|---|---|---|
| 5,554,589 | A * | 9/1996 | Dewille | A23D 9/06 |
| | | | | 426/319 |
| 8,551,551 | B2 * | 10/2013 | Perlman | A23G 9/32 |
| | | | | 426/580 |
| 2007/0298079 | A1 * | 12/2007 | Rivera | A61K 31/202 |
| | | | | 424/439 |
| 2008/0053566 | A1 * | 3/2008 | England | B67C 11/02 |
| | | | | 141/331 |

FOREIGN PATENT DOCUMENTS

| | | |
|---|---|---|
| EP | 2 230 924 A1 | 9/2010 |
| GB | 135 295 A | 11/1919 |
| GB | 207 551 A | 5/1925 |
| GB | 2 330 761 A | 5/1999 |
| RU | 2279224 C2 | 1/2000 |
| WO | 2004 076043 A1 | 9/2004 |
| WO | 2008 075082 A1 | 6/2008 |

OTHER PUBLICATIONS

Clarke; U.S. Appl. No. 15/438,387; Non-Final Office Action dated Aug. 27, 2018; 10 pages.
RU Office Action received for Patent Application No. 2019129615 dated Apr. 8, 2020.
RU Search Report received for Application No. 2019129615 dated Apr. 6, 2020.
CA Examination Report Re: Application No. 3,053,163 dated May 5, 2021.

* cited by examiner

US 11,311,022 B2

SYSTEM AND METHOD FOR MIXING POLYUNSATURATED FATTY ACIDS INTO A FLUID FOOD PRODUCT

TECHNICAL FIELD OF THE DISCLOSURE

This invention relates in general to a system and method of producing a fluid food product, and more particularly to producing a fluid food product with polyunsaturated fatty acids.

BACKGROUND

Milk is consumed by many Americans from a young age. Consuming milk may serve as a convenient way for people, kids in particular, to receive dietary supplements or vitamins. Certain ingredients, supplements, or vitamins may be added to milk to produce milk products having enhanced nutritional qualities. Certain polyunsaturated fatty acids, such as docosahexaenoic acid ("DHA"), may provide health benefits when taken as a supplement. Introducing polyunsaturated fatty acids to milk may enhance the milk's nutritional value. Similarly, introducing polyunsaturated fatty acids to other types of fluid food products may enhance the nutritional value of those fluid food products.

SUMMARY

Particular embodiments described herein include an apparatus for distributing oil into fluid food product. According to some embodiments, an apparatus for distributing oil (such as one or more polyunsaturated fatty acids) into fluid food product includes a batch tank, a transfer line, a pressure tank, a funnel, an oil dispenser, an inline shear mixer, and a flow line. The batch tank holds a volume of fluid food product. The transfer line is in fluid connection with the batch tank. The pressure tank holds a volume of oil and includes a side inlet and a bottom fluid passage. The bottom fluid passage is coupled to the transfer line. The funnel is disposed through a top opening in the pressure tank and dispenses oil into the pressure tank. A stem portion of the funnel extends at least halfway into an interior of the pressure tank. The funnel includes at least one vent allowing gas to escape the pressure tank. The oil dispenser is connected to the pressure tank between the bottom fluid passage and the transfer line. The oil dispenser dispenses oil from the pressure tank into a flow of fluid food product from the batch tank. The inline shear mixer includes an inlet connected to the transfer line downstream from the oil dispenser. The inline shear mixer mixes the fluid food product and the oil. The flow line is connected to an outlet of the inline shear mixer and flows the fluid food product-and-oil mixture to the batch tank.

Particular embodiments described herein include a method for distributing oil (such as one or more polyunsaturated fatty acids) into fluid food product. According to some embodiments, a method of producing a mixture of oil and fluid food product includes: placing a funnel in a top opening of a pressure tank, flushing the pressure tank with nitrogen, flowing the oil into the pressure tank through the funnel, maintaining a flow of nitrogen into the pressure tank, dispensing a flow of fluid food product from the batch tank into a transfer line, dispensing oil from a pressure tank into the transfer line, flowing the dispensed oil and the flow of fluid food product to an inline shear mixer, dispersing the dispensed oil into the flow of fluid food product in the inline shear mixer, flowing the flow of fluid food product comprising the micronized oil-in-fluid food product droplets to the batch tank, and distributing the flow of fluid food product comprising the micronized oil-in-fluid food product droplets in a volume of fluid food product in the batch tank. The stem of the funnel extends at least halfway down into the interior of the pressure tank. Nitrogen flows through the bottom fluid passage until the oxygen level in the pressure tank is 2% or less to flush the pressure tank. The flow of nitrogen is maintained through a side inlet of the pressure tank such that the oxygen level remains at 2% or less. The oil is added to the flow of fluid food product at a pre-determined oil-to-fluid food product ratio. The inline mixer creates a plurality of micronized oil-in-fluid food product droplets in the flow of fluid food product.

Certain embodiments of the present disclosure may provide one or more technical advantages. As an example, the pressure tank prevents oxidation of any introduced polyunsaturated fatty acids by providing an inert environment using pumped-in nitrogen gas. Inserting the funnel such that the stem extends at least halfway into the interior of the pressure tank ensures that the oil transferred to an oxygen-deprived portion of the pressure tank.

In addition, dispensing oil in line (e.g. via a transfer line) into to a flow of fluid food product prevents oil from being exposed to air when being added to fluid food product. The in line dispensing of oil prevents oxidation compared to conventional methods that add oil to a tank of fluid food product via an opening in the tank.

As another example, the use of an inline shear mixer to mix the oil and fluid food product creates micronized droplets of oil in the fluid food product. Creating small droplets of the oil enhances its suspension in the fluid food product. When the oil is suspended, as opposed to floating at the surface, the droplets remain separated from each other and away from oxygen rich environments. Additionally, micronized droplets may be more readily distributed in a volume of fluid food product.

Other technical advantages of the present disclosure will be readily apparent to one skilled in the art from the following figures, descriptions, and claims. Moreover, while specific advantages have been enumerated above, various embodiments can include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Figure 1:
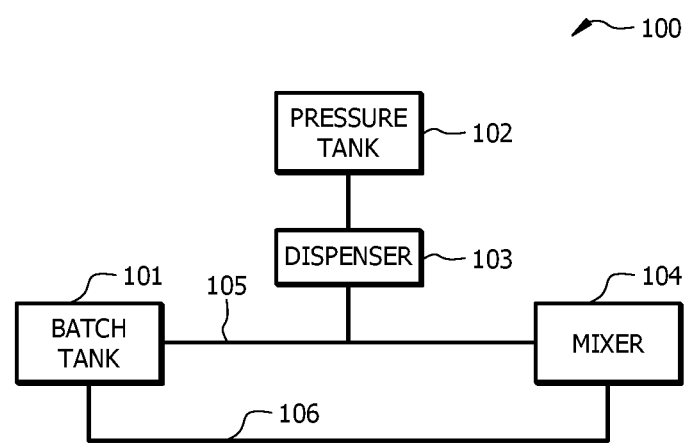
FIG. 1 illustrates an example system for mixing oil into fluid food product, according to some embodiments.

Consuming certain fluid food products may serve as a convenient way for people, kids in particular, to receive dietary supplements or vitamins. Certain ingredients, supplements, or vitamins may be added to the fluid food product to produce fluid food product products having enhanced nutritional qualities. Polyunsaturated fatty acids, such as docosahexaenoic acid ("DHA"), may be added to fluid food products to provide additional nutritional value. Polyunsaturated fatty acids may be suspended in oils in order to transport and mix them into other substances. For example, DHA may be carried in sunflower oil, which may be mixed with a milk.

Several issues arise when attempting to add oils containing polyunsaturated fatty acids to fluid food products. First, polyunsaturated fatty acids are subject to oxidation, which may produce tastes and smells unsuitable for consumption. DHA, in particular, oxidizes readily and despite careful handling, may prove difficult to mix into the fluid food product. Most kids would not be willing to drink a fluid food product, such as a milk, tasting of fish, no matter its nutritional content.

Second, oils often prove difficult to evenly distribute into the target volume of fluid food product. Oils mixed in a fluid food product may clump together and float to the surface of the fluid food product. Oils may also stick to the side of any tanks or vessels containing the fluid food product, preventing effective mixing of the oils into the fluid food product. Thus, the system and methods to introduce polyunsaturated fatty acids into fluid food product discussed herein take steps to both prevent oxidation and enhance distribution of the polyunsaturated fatty acids in the fluid food product.

Typical approaches to adding ingredients to fluid food products include merely adding the supplemental ingredients into a volume of fluid food product in a vessel and mixing the ingredients in the vessel to provide for even distribution. The typical approach applied to adding polyunsaturated fatty acids results in the problems discussed above. What is needed are systems and methods for mixing polyunsaturated fatty acids into fluid food product which prevent oxidation and allow for the even distribution of the acids in the fluid food product.

Certain embodiments relate to a fluid food product comprising polyunsaturated fatty acids. For purposes of example and explanation, certain embodiments throughout the disclosure refer to DHA, DHA oil, or oil. DHA is only one example of a polyunsaturated fatty acid to which this disclosure is directed. An oil comprising any polyunsaturated fatty acid can be used in each of the various embodiments of the systems and methods disclosed herein. In general, polyunsaturated fatty acids (PUFAs) refer to a family of fatty acids that naturally occur in certain fish, leafy green vegetables, and vegetable oils. Polyunsaturated fatty acids can include a carbon chain comprising eighteen or more carbon atoms and two or more double bonds. Examples of polyunsaturated fatty acids include omega fatty acids, such as omega-3 fatty acids (e.g., docosahexaenoic acid (DHA), docosapentaenoic acid (n-3) (DPAn-3), stearidonic acid (SDA), linolenic acid (LNA), and alpha linoleic acid (ALA), and eicosapentaenoic acid (EPA)), and omega-6 fatty acids (e.g., arachidonic acid (ARA), docosapentaenoic acid (n-6) (DPAn-6), linoleic acid (LA), gamma linolenic acid (GLA), and dihomo gamma linolenic acid (n-6)).

For purposes of example and explanation, certain embodiments throughout the disclosure describe adding an oil, such as an oil comprising DHA and/or other PUFA(s), to milk. Milk is only one example of a fluid food product to which this disclosure is directed. In each of the various embodiments of the systems and methods disclosed herein, any fluid food product that may be pumped or flowed through a system using piping or other fluid flow equipment can be used in addition to or as an alternative to milk. For example, fluid food product may refer to beverages (e.g., milks, juices, teas, coffees, waters, combinations of the preceding, etc.), creamers, sauces, toppings, mixtures of edible ingredients, etc. After flowing through the system that adds oil to the fluid food product, the fluid food product may either remain in fluid form or may be further processed into a final food product having a non-fluid form. Furthermore, references to "milk" are not meant to be limiting to any particular type of milk. For example, "milk" may refer to non-animal-sourced beverages, such as soy milk or almond milk. "Milk" may refer to dairy milk, including full fat, 2%, or skimmed milk. The term "milk" should be given meaning to encompass any type of fluid food product that may be considered milk or derived from a milk. Similarly, "teas," "juices," "coffees," and "creamers," encompass any type of fluid food product which may be considered of that type as understood by a person having skill in the art.

In certain embodiments, the problem of oxidation is addressed by providing an oxygen deprived environment for the DHA throughout the mixing process. An operator may receive non-oxidized DHA in a can. The operator pours the DHA from a sealed container into a pressure tank having an oxygen deprived environment. The pressure tank uses a dispenser to dispense the DHA oil into a flow of fluid food product which is then sent to a mixer. The mixer applies shearing forces which create small droplets of DHA oil which are easily suspended in the fluid food product. Because they are suspended in the fluid food product, they are less likely to float to the surface of a volume of fluid food product where it may be exposed to oxygen.

In certain embodiments, the problem of non-uniform distribution may be addressed by suspending the droplets of DHA oil in the fluid food product and mixing that mixture into a large volume of fluid food product. The mixer creates small droplets of the DHA oil that are suspended in the flow of fluid food product. That flow, including the droplets, may flow back to a larger vessel containing the target volume of fluid food product. Since only a portion of the large volume of fluid food product would flow into the mixer, the vessel containing the large volume of fluid food product may be configured to mix the incoming flow with the volume of fluid food product in the vessel. Since the oil droplets are suspended in the introduced flow of fluid food product, the oil is prevented from clumping together or floating to the surface of the volume of fluid food product. Thus, the oil may be prevented from sticking to the sides of the vessel and the suspended droplets may be evenly distributed.

Figure 2:
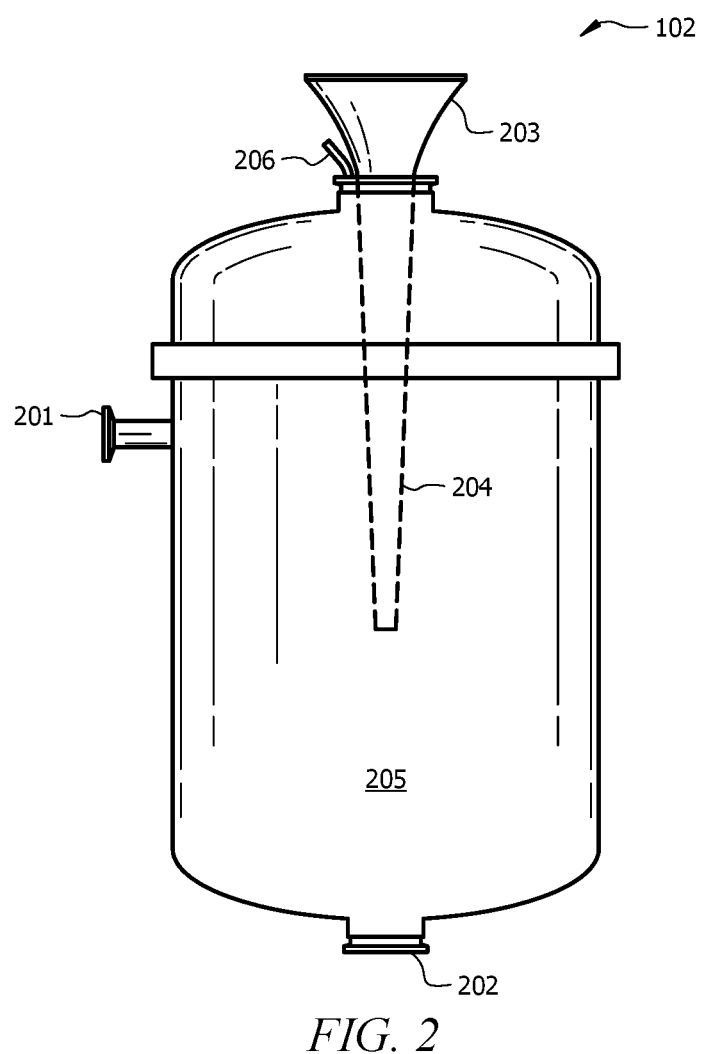
FIG. 2 illustrates an example funnel disposed through a top opening of an example pressure tank, according to some embodiments.
Figure 3:
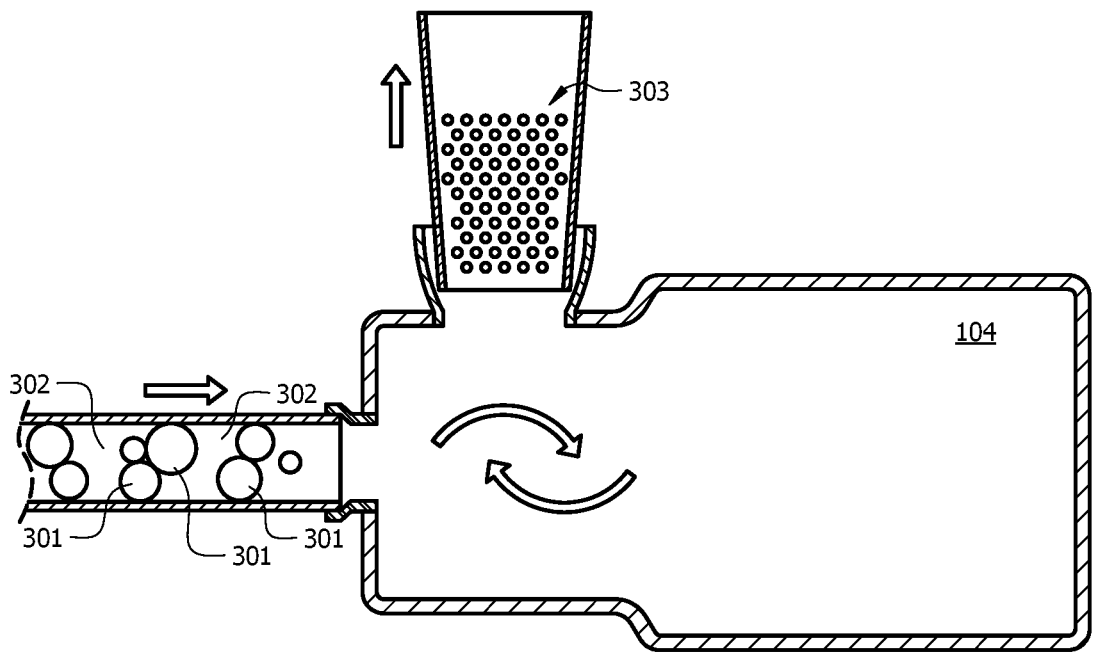
FIG. 3 illustrates an example mixer capable of dispersing oil into a flow of fluid food product, according to some embodiments.
Figure 4:
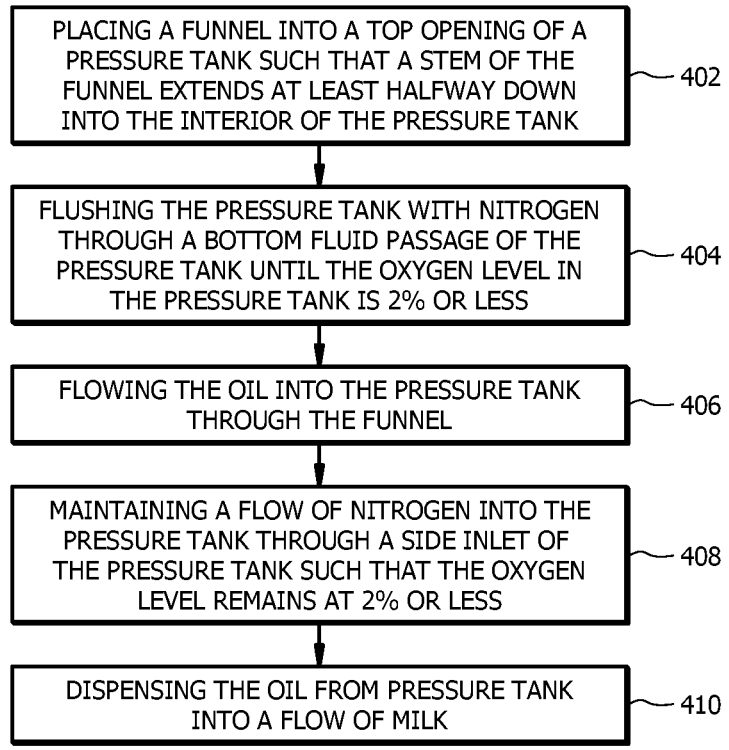
FIG. 4 is a flow diagram illustrating a first example method of mixing oil into fluid food product.
Figure 5:
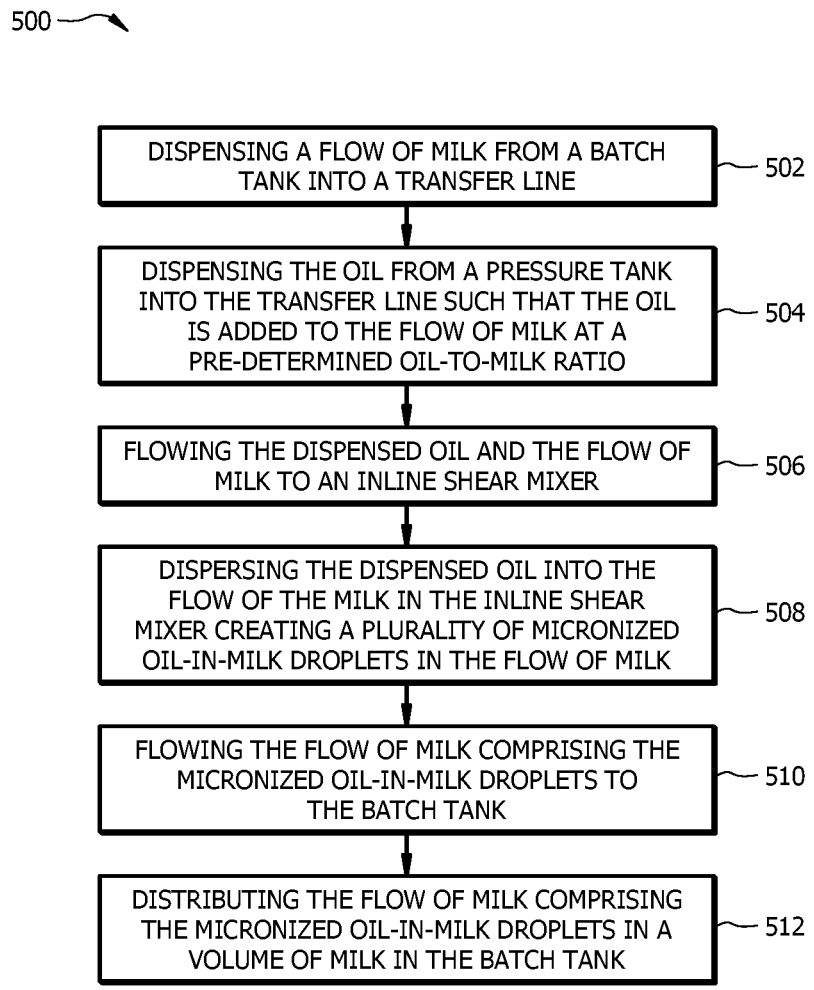
FIG. 5 is a flow diagram illustrating a second example method of mixing oil into fluid food product.
Figure 6:
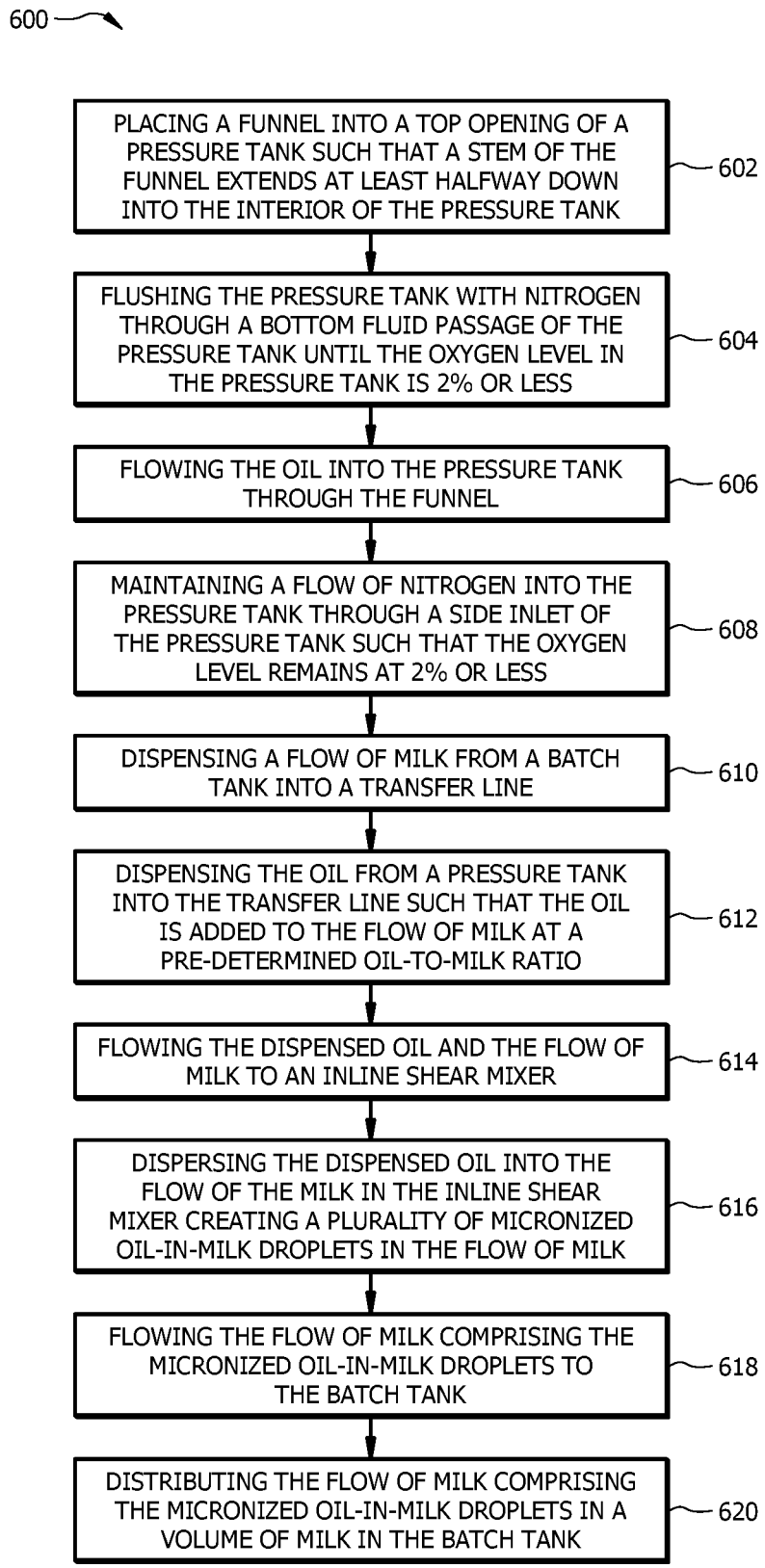
FIG. 6 is a flow diagram illustrating a third example method of mixing oil into fluid food product.

Methods and systems addressing these problems will be described in more detail using FIGS. 1 through 6. FIG. 1 illustrates an example system for mixing oil into a fluid food product. FIG. 2 illustrates an example funnel disposed through an example pressure tank. FIG. 3 illustrates an example mixer capable of dispersing oil into a flow of fluid food product. FIG. 4-6 illustrate various examples of methods of mixing oil into a fluid food product. Embodiments of the present invention and its advantages are best understood by referring to FIGS. 1-6 of the drawings, like numerals being used for like and corresponding parts of the various drawings.

FIG. 1 illustrates an example system for mixing oil into fluid food product, according to some embodiments. System 100 includes a batch tank 101, a pressure tank 102, an oil dispenser 103, a mixer 104, a transfer line 105, and a flow line 106. Milk, used as an example fluid food product throughout, may flow from batch tank 101 towards mixer 104 in transfer line 105. Oil may flow from pressure tank 102 to oil dispenser 103. Oil dispenser 103 may dispense oil into transfer line 105 into a flow the milk. Both the oil and milk flow into mixer 104. After mixing, the oil and milk enter flow line 106 and flow to batch tank 101.

Batch tank 101 may be any suitable vessel capable of holding a volume of milk. For example, batch tank 101 may be a 20,000 gallon stainless-steel tank. Batch tank 101 may include a number of inlets and outlets in order to receive or discharge a flow of milk. Batch tank 101 have may be in fluid connection with transfer line 105. For example, batch tank 101 may include an outlet coupled to transfer line 105 directly. Alternatively, batch tank 101 and transfer line 105 are coupled indirectly through tubing or piping, for example.

A portion of the volume of milk in batch tank 101 may be discharged as a flow of milk into transfer line 105. During the process of adding oil into the milk, not all of the volume of milk in batch tank 101 needs to be discharged. In some cases, only a small fraction of the volume of milk is discharged. For example, in the case of a 20,000 gallon batch tank 101, discharging only 5,000 gallons of milk from batch tank 101 may allow for suitable mixing with the oil. In this example, the oil is dispensed and mixed into those 5,000 gallons as they circulate in system 100. The oil is then received and mixed into the volume of milk in batch tank 101 (e.g. the remaining 15,000 gallons) when those 5,000 gallons return. The flow of milk to and from batch tank 101 may be a continuous process or may occur in stages.

In some embodiments, batch tank 101 includes means to distribute the oil from a flow of oil and milk from flow line 106 into the volume of milk in batch tank 101. This is necessary if only a portion of the volume of milk in batch tank 101 is discharged and mixed with oil in mixer 104. Any suitable means to mix fluids or distribute an emulsion of a substance in a fluid may be used, including agitators disposed in batch tank 101. Mixing using agitators may be finely tuned by varying the impeller number, impeller design, placement, and rotational velocity. For example, rotational velocity is selected to ensure uniformity of distribution of the oil in the milk, but is also adjusted to prevent vortex formation that could entrain air, prevent coalescing of droplets, as well as, maintain oil droplets in suspension.

Pressure tank 102 may be operable to hold a volume of the oil before it is mixed with the volume of milk in the batch tank 101. A portion of pressure tank 102 may be coupled to transfer line 105. There may be intermediary components or areas through which the oil passes before flowing to transfer line 105. For example, oil may flow from the pressure tank 102 to oil dispenser 103 before entering transfer line 105 into a flow of milk. Further details regarding pressure tank 102 may be found below in reference to FIG. 2.

Oil dispenser 103 may be connected to the pressure tank 102. Oil dispenser 103 controls the flow of oil dispensed from pressure tank 102 into transfer line 105. Oil dispenser 103 may dispense the oil continuously into a flow of milk in transfer line 105. In some embodiments, oil is dispensed from the pressure tank 102 through dispenser 103 into the flow of milk at a predetermined oil-to-milk ratio. For example, the predetermined oil-to-milk ratio may be a weight (e.g. pounds) of the oil to volume (e.g. gallons) of milk ratio.

In particular embodiments, oil dispenser 103 includes a mass flow meter operable to control the flow of oil from pressure tank 102 into transfer line 105. The mass flow meter may control a metering valve that allows the oil to move from pressure tank 102 at a specific weight to volume ratio. In some embodiments, the mass flow meter controls the flow of oil to dispense one pound of oil per one hundred gallons of milk. The weight to volume ratio may be adjusted to maintain optimal mixing of oil into the milk. For example, different weight to volume ratios may affect the droplet size of the oil after mixing in mixer 104. Additionally, different ratios may change the amount of time system 100 must operate to add a volume of oil to the milk.

After the oil is dispensed into a flow of milk, transfer line 105 may direct the oil and milk into mixer 104. The mixer 104 may mix the oil into the milk and transfer the oil-in-milk mixture to the batch tank 101 through flow line 106. Further details regarding mixer 104 may be found below in reference to FIG. 3.

Modifications, additions, or omissions can be made to system 100 without departing from the scope of the invention. The components of system 100 can be integrated or separated. Moreover, the operations of system 100 can be performed by more, fewer, or other components.

FIG. 2 illustrates an example funnel disposed through an example pressure tank, according to some embodiments. Pressure tank 102 includes a side inlet 201 and a bottom fluid passage 202. Bottom fluid passage 202 is coupled to transfer line 105.

Nitrogen and/or any other inert gas or gasses, may flow into pressure tank 102 through side inlet 201 and/or bottom fluid passage 202. The inert gas displaces oxygen in a space, thereby preventing the oxidation of any oil disposed within that space. For example, inert gas may flow into pressure tank 102 to provide an oxygen level in pressure tank 102 of 2% or less. By reducing the oxygen level to this level, oil dispensed in pressure tank 102 may not be oxidized.

In particular embodiments, system 100 further includes a nitrogen tank in fluid connection with pressure tank 102 through bottom fluid passage 202 and side inlet 201. The nitrogen tank may be any suitable pressurized vessel containing a volume of nitrogen which may flow into pressure tank 102 to provide an inert environment. One or more valves between the nitrogen tank and pressure tank 102 may control the volume of nitrogen into pressure tank 102. For example, a flow meter may be placed between the nitrogen tank and pressure tank 102, the flow meter controlling the rate of flow of nitrogen into pressure tank 102 from the nitrogen tank.

The flow of nitrogen to pressure tank 102 may modulate depending on the stage of the process. Additionally, the flow of nitrogen may take different paths into pressure tank 102 depending on the stage of the process. For example, the one or more valves may be operable to operate in a purge mode and a maintenance mode. The purge mode allows the nitrogen to be dispensed through bottom fluid passage 202 and optionally through side inlet 201 of pressure tank 102. Before entering the purge mode, pressure tank 102 may be substantially empty except for outside air, including oxygen. The purge mode may allow nitrogen to flow into pressure tank 102 through bottom fluid passage 202 at a high rate in order to quickly lower the oxygen levels in pressure tank 102.

The maintenance mode allows nitrogen to be dispensed through side inlet 201 without allowing nitrogen through bottom fluid passage 202. After dispensing the desired volume of oil in pressure tank 102, system 100 may enter the maintenance mode. In this mode, the rate of flow of nitrogen may decrease, but still maintained at a rate sufficient to maintain a low oxygen level, preferably below 2%. Nitrogen may not flow in through bottom fluid passage 202 in this mode because it may interfere with the dispensing of oil into the flow of milk. Oil will leave pressure tank 102 through the same bottom fluid passage 202. If gas flows into pressure tank through the same passage at the same time, then it may disrupt the flow of oil and potentially cause undesired bubbling or oxidation.

Before any oil is dispensed in pressure tank 102, oxygen is purged from pressure tank 102 by dispensing nitrogen into pressure tank 102 to displace the oxygen. Nitrogen gas may be dispensed at a high rate of cubic feet per hour ("cf/h") when purging the oxygen in order to quickly lower the oxygen levels in pressure tank 102. For example, the nitrogen may flow into pressure tank 102 at a rate of 200 cf/h 400 cf/h. After pressure tank 102 is flushed with nitrogen, the oxygen level in pressure tank 102 is 2% or less. Put another way, pressure tank 102 has an oxygen level of 2% or less when oil is present within pressure tank 102.

Funnel 203 may be disposed through a top opening of the pressure tank 102. At the beginning of the process of mixing oil into milk, an operator may dispense a volume of oil into pressure tank 102 through funnel 203. The funnel 203 may comprise a stem 204 and a vent 206. When so disposed, stem 204 of the funnel 203 extends at least halfway into an interior 205 of the pressure tank 102. Funnel 203 delivers the poured oil into a bottom portion of the interior of pressure tank 102. This bottom portion may be oxygen-deprived, preventing the oxidation of the oil after it is poured in. For example, pressure tank 102 may be pumped with nitrogen gas such that a layer of nitrogen fills the bottom of pressure tank 102. Stem 204 of funnel 203 extends into this layer and delivers the oil into the layer of nitrogen.

On the other hand, stem 204 of funnel 203 may not extend all the way to the bottom of pressure tank 102. Backsplash is prevented by keeping some space between the bottom of pressure tank 102 and the end of funnel 203. Backsplash may interfere with the delivery of the oil into pressure tank 102. For example, backsplash can mix oxygen into pressure tank 102 causing oxidation of the oil within pressure tank 102.

One or more vents 206 of funnel 203 may aid in delivering oil into pressure tank 102. As mentioned above, disturbing the flow of oil into pressure tank 102 may mix oxygen into pressure tank 102, which is detrimental to the oil. Vent 206 allows gas to escape from pressure tank 102 as oil displaces it when dispensed into pressure tank 102. Venting the gas prevents pressure buildup and other disturbing forces within pressure tank 102 that may disrupt the flow of oil and mix outside air into pressure tank 102.

In particular embodiments, funnel 203 further comprises a cap disposed over a top opening of funnel 203. The cap comprises a vent. After the desired volume of oil is dispensed to pressure tank 102, an operator installs a cap onto the top of funnel 203 to prevent oxygen from entering pressure tank 102. Thus, when funnel 203 is not currently used to dispense oil, the cap placed over the top opening of funnel 203 prevents the entry of outside air containing oxygen. The cap includes a vent in order to prevent gas pressure build up within pressure tank 102. For example, as a nitrogen flow is maintained to pressure tank 102, excess gas may be vented through at least one vent, including a vent on the cap on funnel 203.

After the oil is dispensed into pressure tank 102, nitrogen may now flow through side inlet 201 in order to maintain the low oxygen level. Since pressure tank 102 had already been flushed, the flow of nitrogen through side inlet 201 may flow at a lower rate. For example, the nitrogen may flow through side inlet 201 at a rate of 20 cf/h.

In particular embodiments, side inlet 201 of pressure tank 102 comprises a spray ball. A spray ball extends into pressure tank 102 such that any gas or fluid flowing through side inlet 201 into pressure tank 102 flows through the spray ball before entering pressure tank 102. The spray ball may enhance the dispersion of the gas or fluid within pressure tank 102. For example, the spray ball may direct the flow of nitrogen towards all areas inside pressure tank 102, preventing uneven distribution. In addition, the spray ball may enhance the rinsing of pressure tank 102 after oil is dispensed. For example, after the volume of oil is dispensed from pressure tank 102, a residue of oil may remain on the sides and bottom of the interior of pressure tank 102. The residue oil may be mixed into milk by rinsing pressure tank 102 with milk through side inlet 102. The spray ball helps the rinsing process by spraying milk onto all the interior surfaces of pressure tank 102. The milk and rinsed off oil may flow through bottom passage 202 and be dispensed at the same rate as the oil was into a flow of milk.

In particular embodiments, side inlet 201 of pressure tank 102 may be an entrance point for cleaning solutions, which may be used to clean the interior of pressure tank 102. For example, side inlet 201 may allow cleaning solutions comprising hot alkaline and acid solutions to flow into pressure tank 102. The cleaning solutions may clean the interior of pressure tank 102, rendering the system sanitary and suitable for food use. In particular embodiments, a central Cleaning in Place ("CIP") system is coupled to one or more components of system 100, including batch tank 101, pressure tank 102, dispenser 103, mixer 104, transfer line 105, and/or flow line 106. In some embodiments, pressure tank 102 is coupled to a central CIP system through side inlet 201, such that a cleaning solution may flow from the central CIP into pressure tank 102 through at least side inlet 201.

FIG. 3 illustrates an example mixer capable of dispersing oil into a flow of fluid food product, according to some embodiments. Mixer 104 receives a flow of milk 302 with dispensed oil 301. Mixer 104 then mixes the flow of milk 302 and dispensed oil 301 to create micronized oil-in-milk droplets 303. The micronized oil-in-milk droplets 303 then flow from mixer 104 to batch tank 101 through flow line 106.

In particular embodiments, mixer 104 is an inline shear mixer. Disposing mixer 104 inline allows mixing without the introduction of outside air. Inline mixing prevents aeration and oxidation of the oil within the flow of milk. Additionally, inline mixing allows for the mixing to be a continuous process, mixing a continuous flow of oil and milk.

Normally oil and milk do not mix. As discussed above, one problem with mixing oil and milk is that oil normally coagulates and floats to the surface of the milk. Shear mixing solves this issue by creating an emulsion of the oil in the milk. For example, a motor may rotate an impellor or high-speed rotor which provides a shear force on the oil in the flow of milk in mixer 104. The shear force creates smaller droplets of oil. Smaller droplets of oil are more easily suspended in the milk and distributed among a volume of milk.

In particular embodiments, mixer 104 may create a micronized oil-in-milk mixture having an average droplet size in the range of between 3 and 5 microns. At this size, the droplets are less likely to coagulate and more likely to remain suspended in the milk. Thus, even after flowing in flow line 106 and being mixed with the volume of milk in batch tank 101, the droplets may remain separate. As a result, the oil may be distributed substantially uniformly throughout the volume of milk in batch tank 101, successfully mixing the oil into the target volume of milk.

As shown above, certain embodiments of system 100 prevent oxidation of the oil and create a uniform distribution of the oil in milk. Oxidation is prevented by maintaining the oil in oxygen deprived environments from its time in pressure tank 102 to mixer 104 and in batch tank 101. Uniform distribution is enhanced by using mixer 104 which creates micronized oil-in-milk droplets. The droplets may easily be distributed within the milk without coagulation and sticking to the sides of batch tank 101.

FIG. 4 is a flow diagram illustrating a first example method of mixing oil into fluid food product. While particular embodiments will be described wherein components of system 100 perform certain steps of method 400, any suitable component or combination of components of system 100 may perform one or more steps of the method.

In step 402, an operator places funnel 203 into a top opening of pressure tank 102. Funnel 203 is disposed such that stem 204 of funnel 203 extends at least halfway down into the interior of pressure tank 102. As discussed earlier, the stem 204 extending down into pressure tank 102 allows the oil dispensed into pressure tank 102 to be dispensed into an oxygen-deprived portion of pressure tank 102.

After funnel 203 is positioned, the operator may provide an oxygen-deprived environment inside pressure tank 102. At step 404, pressure tank 102 is flushed with nitrogen through bottom fluid passage 202. As nitrogen flows into pressure tank 102, the air is displaced through a vent and is removed from pressure tank 102. The flushing of pressure tank 102 continues until the oxygen level in pressure tank 102 reaches 2% or less. In particular embodiments, the flushing of pressure tank 102 includes flowing nitrogen into pressure tank 102 at a rate 200 cf/h or 400 cf/h.

After a suitable environment is provided, oil may flow into pressure tank 102. At step 406, an operator may pour oil into pressure tank 102 through funnel 203. The oil is dispensed at a bottom portion of pressure tank 102 where stem 204 of funnel 203 ends. Since pressure tank 102 was flushed with nitrogen, the oil may be dispensed into a layer of nitrogen, a space having a low oxygen level.

The oxygen-deprived environment is maintained even after the oil is dispensed into pressure tank 102. At step 408, a flow of nitrogen is maintained into pressure tank 102 through side inlet 201. This maintenance flow ensures that the oxygen level within pressure tank 102 remains at 2% or less. During the process of mixing oil and milk, nitrogen may flow out of pressure tank 102 and be replaced by outside air. In order to prevent the mixing of oxygen and the oil, nitrogen may continue to flow into pressure tank 102 through side inlet 201. In particular embodiments, the maintenance flow includes flowing nitrogen through side inlet 201 at a rate of 20 cf/h.

By flowing the nitrogen through side inlet 201 of pressure tank 102, disruption of the dispensing of the oil through bottom fluid passage 202 is minimized. In particular embodiments, side inlet 201 includes a spray ball which enhances the flow of nitrogen into pressure tank 102. The spray ball more evenly distributes the gas or fluid flowing through side inlet 201 into pressure tank 102.

At step 410, the oil is dispensed from pressure tank 102 into a flow of milk. In particular embodiments, the oil is dispensed from the pressure tank into the flow of milk at a pre-determined oil-to-milk ratio, wherein the pre-determined oil-to-milk ratio is approximately one pound of oil per one hundred gallons of milk. Each step helps ensures that the oil dispensed into the flow of milk has not been oxidized. Thus, when added to the flow of milk, the oil may be effectively mixed into the milk.

In particular embodiments, method 400 may further comprise the steps of rinsing the pressure tank with milk and dispensing the rinsing milk from pressure tank 102 into the flow of milk. After the oil is dispensed from pressure tank 102, a portion of the oil may remain in pressure tank 102 stuck to its interior. In order to remove the residue oil, milk may flow through side inlet 201 in order to rinse pressure tank 102. The milk and rinsed-off residue oil may then be dispensed. The rinsing milk may be dispensed from pressure tank 102 in the same manner that the oil had been dispensed. Particularly, the rinsing milk may flow through bottom fluid passage 202 to dispenser 103. Dispenser 103 may dispense the rinsing milk at the same weight to volume ratio as the oil.

Modifications, additions, or omissions may be made to method 400 depicted in FIG. 4. Method 400 may include more, fewer, or other steps. For example, steps may be performed in parallel or in any suitable order. While discussed as various components of system 100 performing the steps, any suitable component or combination of components of system 100 may perform one or more steps of the method.

FIG. 5 is a flow diagram illustrating a second example method of mixing oil into fluid food product. While particular embodiments will be described wherein components of system 100 of performing the steps of method 500, any suitable component or combination of components of system 100 may perform one or more steps of the method.

Oil is mixed into a target volume of milk in method 500. At step 502, an operator dispenses a flow of milk from batch tank 101 into transfer line 105. Batch tank 101 holds the target volume of milk into which the oil is mixed. Only a portion of the volume, however, is dispensed into transfer line 105. In this manner, an amount of oil may be mixed into a volume of milk without having to flow the entire volume of milk through different components of the system.

At step 504, oil is dispensed from pressure tank 102 into transfer line 105. The oil is added to the flow of milk at a pre-determined oil-to-milk ratio. For example, pressure tank 102 may be coupled to transfer line 105 such that a line from dispenser 103 and the line from batch tank 101 form a T-junction, into which both the oil and flow of milk flow and mix together. In particular embodiments, the oil-to-milk ratio is approximately one pound of oil per one hundred gallons of milk. In particular embodiments, pressure tank 102 is provided an oxygen level of 2% or less while the oil is present. In this manner, the oil dispensed into the flow of milk has not been oxidized.

After the oil is dispensed, at step 506, the flow of milk and dispensed oil flow to mixer 104. For example, the flow of milk and dispensed oil may flow to an inlet of an inline shear mixer. Once at mixer 104, at step 508, the oil may be dispersed into the flow of milk. Mixer 104 creates a plurality of micronized oil-in-milk droplets in the milk. For example, an inline shear mixer may create oil-in-milk droplets having an average droplet size ranging from 3 to 5 microns. The emulsion created helps maintain the droplets suspended in the milk and aids in their distribution into the larger volume of milk in batch tank 101.

At step 510, the flow of milk comprising the micronized oil-in-milk droplets flows to batch tank 101. The flow may be received by an inlet of batch tank 101. After flowing back to batch tank 101, the oil within the flow may be distributed within the target volume of milk. At step 512, the flow of milk comprising the micronized oil-in-milk droplets is distributed in the volume of milk in batch tank 101. The distribution of the oil-in-milk droplets may occur by any suitable means, including, for example, impellers in batch tank 101 agitating the volume of milk. Since the droplets are suspended in the flow of milk, they may be easily distributed into the volume of milk in batch tank 101. As a result, even though only a portion of the target volume of milk flowed out of batch tank 101, the oil may be distributed across the entire volume of milk in batch tank 101.

Modifications, additions, or omissions may be made to method 500 depicted in FIG. 5. Method 500 may include more, fewer, or other steps. For example, steps may be performed in parallel or in any suitable order. While discussed as various components of system 100 performing the steps, any suitable component or combination of components of system 100 may perform one or more steps of the method.

FIG. 6 is a flow diagram illustrating a third example method of mixing oil into fluid food product. While particular embodiments will be described wherein components of system 100 of performing the steps of method 600, any suitable component or combination of components of system 100 may perform one or more steps of the method. Method 600 may comprise one or more steps from each of method 400 and method 500.

At step 602, funnel 203 is placed into a top opening of pressure tank 102 such that stem 204 of funnel 203 extends at least halfway down into the interior of pressure tank 102. As described above, this step helps prevent oxidation and aids with the delivery of the oil into pressure tank.

At step 604, pressure tank 102 is flushed with nitrogen through bottom fluid passage 202 of the pressure tank 102. Flushing continues until the oxygen level in pressure tank 102 reaches 2% or less.

At step 606, oil flows into pressure tank 102 through funnel 203.

At step 608, a flow of nitrogen is maintained into pressure tank 102 through side inlet 201 of pressure tank 102. This ensures that such that the oxygen level remains at 2% or less.

At step 610, a flow of milk is dispensed from batch tank 101 into transfer line 105. At step 612, oil is dispensed pressure tank 102 into transfer line 105 such that the oil is added to the flow of milk at a pre-determined oil-to-milk ratio. For example, the oil may be dispensed at a weight to volume ratio of one pound of oil for every one hundred gallons of milk.

After the oil is dispensed into the flow of milk in transfer line 105, at step 614, the dispensed oil and the flow of milk flow to mixer 104. Mixer 104 may comprise an inline shear mixer, which uses shear forces to disperse the oil in the milk.

At step 616, the dispensed oil is dispersed into the flow of the milk in the inline shear mixer creating a plurality of micronized oil-in-milk droplets in the flow of milk. For example, the micronized oil-in-milk droplets may be sufficiently small to remain in suspension throughout the mixing process.

The droplets of oil must then be distributed into the target volume of milk. At step 618, the flow of milk comprising the micronized oil-in-milk droplets flows back to batch tank 101. After entering batch tank 101, at step 620, the flow of milk comprising the micronized oil-in-milk droplets is distributed in a volume of milk in batch tank 101. For example, batch tank 101 may comprise agitators, such as a plurality of impellors, which mix and distribute the flow comprising the droplets within the volume of milk. Because the droplets are small, they remain suspended and may be uniformly distributed in the target volume of milk.

In particular embodiments, method 600 further comprises steps of rinsing pressure tank 102 with milk and dispensing the rinsing milk into the flow of milk from batch tank 101. For example, after the dispensing the oil from pressure tank 102, residue oil may remain inside pressure tank 102. Milk may flow from batch tank 101, or any other source, into pressure tank 102 through side inlet 201. After being used to rinse pressure tank 102, the milk may be dispensed into transfer line 105 and flow back to batch tank 101.

In particular embodiments, method 600 further comprises the step of pasteurizing the volume of milk comprising micronized oil-in-milk droplets. After oil is mixed into the target volume of milk, the resulting enhanced milk may still need further processing to create a safe-to-consume beverage. Subjecting the volume of milk to pasteurization kills harmful microbes, thereby producing a consumable product.

Modifications, additions, or omissions may be made to method 400 depicted in FIG. 6. Method 600 may include more, fewer, or other steps. For example, steps may be performed in parallel or in any suitable order. While discussed as various components of system 100 performing the steps, any suitable component or combination of components of system 100 may perform one or more steps of the method.

The systems and methods described herein may include one or more technical advantages. For example, using pressure tank 102 prevents oxidation of any introduced polyunsaturated fatty acids by providing an inert environment using pumped-in nitrogen gas. By first flushing the vessel holding the oil during the process and maintaining a flow of nitrogen, low oxygen levels are maintained, limiting oxidation. Inserting the funnel such that the stem extends at least halfway into the interior of the pressure tank ensures that the oil transferred to an oxygen-deprived portion of the pressure tank, e.g. into a layer of nitrogen.

In addition, dispensing oil in line (e.g. via a transfer line) into to a flow of fluid food product prevents oil from being exposed to air when being added to fluid food product. The in line dispensing of oil prevents oxidation compared to conventional methods that add oil to a tank of fluid food product via an opening in the tank.

As another example, the use of an inline shear mixer to mix the oil and fluid food product creates micronized droplets of oil in the fluid food product. Using an inline mixer prevents the introduction of outside air into the mixing process. Using shear forces to create small droplets of the oil enhances its suspension in the fluid food product. When the oil is suspended, as opposed to floating at the surface, the droplets remain separated from each other and away from oxygen rich environments. Additionally, micronized droplets may be more readily distributed in a volume of fluid food product.

Although the present disclosure has been described with several embodiments, numerous changes, variations, alterations, transformations, and modifications can be suggested to one skilled in the art, and it is intended that the present disclosure encompass such changes, variations, alterations, transformations, and modifications as fall within the scope of the appended claims.

What is claimed is:

1. A method of mixing oil and a fluid food product, comprising
   placing a funnel into a top opening of a pressure tank such that a stem of the funnel extends at least halfway down into the interior of the pressure tank;
   flushing the pressure tank with nitrogen by flowing the nitrogen through a bottom fluid passage of the pressure tank until the oxygen level in the pressure tank is 2% or less, wherein the bottom fluid passage provides an inlet positioned in a bottom side of the pressure tank;

flowing an oil into the pressure tank through the funnel into an oxygen-deprived portion of the pressure tank at least halfway down into the interior of the pressure tank;

maintaining a flow of nitrogen into the pressure tank containing the oil such that the oxygen level remains at 2% or less, the flow of nitrogen provided through a side inlet of the pressure tank without flowing the nitrogen through the bottom fluid passage, the side inlet positioned in a sidewall of the pressure tank that extends between a top side and the bottom side of the pressure tank; and dispensing the oil from the pressure tank into a flow of fluid food product via the bottom fluid passage.

2. The method of claim 1, wherein the oil is dispensed from the pressure tank into the flow of fluid food product at a pre-determined oil-to-fluid food product ratio, wherein the pre-determined oil-to-fluid food product ratio is approximately 1 pound of oil per 100 gallons of fluid food product.

3. The method of claim 1, wherein flushing the pressure tank comprises flowing nitrogen into the pressure tank at a rate of 200 cf/h or 400 cf/h.

4. The method of claim 1, wherein maintaining the flow of nitrogen into the pressure tank comprises flowing the nitrogen through a spray ball that extends into the interior of the pressure tank via the side inlet of the pressure tank.

5. The method of claim 1, wherein maintaining a flow of nitrogen comprises flowing nitrogen through the side inlet at a rate of 20 cf/h.

6. The method of claim 1, further comprising:
rinsing residual oil from the pressure tank by flowing fluid food product through the side inlet of the pressure tank; and
dispensing the rinsing fluid food product and the residual oil from the pressure tank into the flow of fluid food product.

7. A method of mixing oil and a fluid food product, comprising:
dispensing a flow of fluid food product from a batch tank into a transfer line that directs the flow of fluid product toward an inline shear mixer;
dispensing an oil from a pressure tank having an oxygen level of 2% or less into the transfer line such that the oil is added to the flow of fluid food product at a pre-determined oil-to-fluid food product ratio, wherein the pressure tank couples to the transfer line such that the oil dispenses into the flow of fluid food product without exposing the oil to outside air;
flowing the dispensed oil and the flow of fluid food product to the inline shear mixer via the transfer line;
dispersing the dispensed oil into the flow of the fluid food product in the inline shear mixer creating a plurality of micronized oil-in-fluid food product droplets in the flow of fluid food product;
flowing the flow of fluid food product comprising the micronized oil-in-fluid food product droplets to the batch tank; and
distributing the flow of fluid food product comprising the micronized oil-in-fluid food product droplets in a volume of fluid food product in the batch tank.

8. The method of claim 7, wherein dispensing an oil from the pressure tank comprises providing the pressure tank with an oxygen level of 2% or less.

9. The method of claim 7, wherein the pre-determined oil-to-fluid food product ratio is approximately 1 pound of oil per 100 gallons of fluid food product.

10. The method of claim 7, further comprising:
rinsing the pressure tank with fluid food product;
dispensing the rinsing fluid food product into the flow of fluid food product from the batch tank.

11. The method of claim 7, wherein the plurality of micronized oil-in-fluid food product droplets have an average droplet size in the range of between 3 and 5 microns.

12. A method of producing a mixture of oil and a fluid food product, comprising:
placing a funnel into a top opening of a pressure tank such that a stem of the funnel extends at least halfway down into the interior of the pressure tank;
flushing the pressure tank with nitrogen by flowing the nitrogen through a bottom fluid passage of the pressure tank until the oxygen level in the pressure tank is 2% or less, wherein the bottom fluid passage provides an inlet positioned in a bottom side of the pressure tank;
flowing an oil into the pressure tank through the funnel into an oxygen-deprived portion of the pressure tank at least halfway down into the interior of the pressure tank;
maintaining a flow of nitrogen into the pressure tank containing the oil such that the oxygen level remains at 2% or less, the flow of nitrogen provided through a side inlet of the pressure tank without flowing the nitrogen through the bottom fluid passage, the side inlet positioned in a sidewall of the pressure tank that extends between a top side and the bottom side of the pressure tank;
dispensing a flow of fluid food product from a batch tank into a transfer line that directs the flow of fluid product toward an inline shear mixer;
dispensing the oil from the bottom fluid passage of the pressure tank having the oxygen level of 2% or less, the oil dispensed into the transfer line via an oil dispenser such that the oil is added to the flow of fluid food product at a pre-determined oil-to-fluid food product ratio, wherein the oil dispenser includes a mass flow meter configured to control an oil to fluid food product weight to volume ratio of oil dispensed into the transfer line and wherein the pressure tank couples to the transfer line such that the oil dispenses into the flow of fluid food product without exposing the oil to outside air;
flowing the dispensed oil and the flow of fluid food product to the inline shear mixer via the transfer line;
dispersing the dispensed oil into the flow of the fluid food product in the inline shear mixer creating a plurality of micronized oil-in-fluid food product droplets in the flow of fluid food product;
flowing the flow of fluid food product comprising the micronized oil-in-fluid food product droplets to the batch tank;
distributing the flow of fluid food product comprising the micronized oil-in-fluid food product droplets in a volume of fluid food product in the batch tank; and
agitating the volume of fluid food product in the batch tank to create a substantially uniform distribution of the micronized oil-in-fluid food product droplets in the volume of fluid food product in the batch tank.

13. The method of claim 12, wherein the pre-determined oil-to-fluid food product ratio is approximately 1 pound of oil per 100 gallons of fluid food product.

14. The method of claim 12, wherein flushing the pressure tank comprises flowing nitrogen into the pressure tank at a rate of 200 cf/h or 400 cf/h.

15. The method of claim 12, wherein maintaining a flow of nitrogen comprises flowing nitrogen gas through the side inlet at a rate of 20 cf/h.

16. The method of claim 12, further comprising:
   rinsing the pressure tank with fluid food product; and
   dispensing the rinsing fluid food product into the flow of fluid food product from the batch tank.

17. The method of claim 12, wherein the fluid food product is dairy milk and the oil comprises docosahexaenoic acid (DHA).

18. The method of claim 12, further comprising pasteurizing the volume of fluid food product comprising micronized oil-in-fluid food product droplets.

19. The method of claim 12, wherein the plurality of micronized oil-in-fluid food product droplets have an average droplet size in the range of between 3 and 5 microns.

* * * * *